United States Patent [19]

Murakami et al.

[11] Patent Number: 4,841,298
[45] Date of Patent: Jun. 20, 1989

[54] BIT PATTERN CONVERSION SYSTEM

[75] Inventors: Joji Murakami, Kawasaki; Syogo Sibazaki, Yokohama; Junya Tempaku, Yokosuka, all of Japan

[73] Assignees: Fujitsu Limited; Fujitsu Microcomputer Systems Limited, both of Kawasaki, Japan

[21] Appl. No.: 132,441

[22] Filed: Dec. 14, 1987

[30] Foreign Application Priority Data

Dec. 19, 1986 [JP] Japan .................................. 61-301657

[51] Int. Cl.⁴ ............................................. H03M 7/02
[52] U.S. Cl. ....................................... 341/51; 341/55; 341/52; 341/61; 341/88; 341/89; 341/99
[58] Field of Search ........................ 341/51, 55, 52, 61, 341/88, 89, 99

[56] References Cited

U.S. PATENT DOCUMENTS

| | | | |
|---|---|---|---|
| 3,051,929 | 8/1962 | Smith | 341/61 |
| 3,315,234 | 4/1967 | Ruth | 340/172.5 |
| 3,860,908 | 1/1975 | Stratton, III | 341/88 |
| 4,761,673 | 8/1988 | Watanabe et al. | 355/14 R |

Primary Examiner—William M. Shoop, Jr.
Assistant Examiner—G. Romano
Attorney, Agent, or Firm—Armstrong, Nikaido, Marmelstein, Kubovcik & Murray

[57] ABSTRACT

A bit pattern conversion system for converting a sequence of a bit pattern between a central processing unit and a peripheral circuit, including a data bus line connected between the central processing unit and the peripheral circuit, and a conversion circuit provided in the peripheral circuit for converting the sequence of the bit pattern from a most significant bit to a least significant bit, and vice versa, in accordance with a conversion signal.

8 Claims, 4 Drawing Sheets

BIT PATTERN CONVERSION SYSTEM

BACKGROUND OF THE INVENTION

1. Field of the Invention

The present invention relates to a bit pattern conversion system for converting a sequence of a bit pattern from a most significant bit (MSB) to a least significant bit (LSB), and vice versa.

2. Description of the Related Art

In a computer system, a data bus line is provided, for example, between a central processing unit (CPU) and a memory (RAM), and used for transferring data therebetween in series. The data stored in the memory is read out by, for example, a CRT controller as a peripheral circuit to display the data on the CRT. In this case, the sequence of the bit pattern of the data transferred in series from the CPU is often converted from the MSB to the LSB, and vice versa, when the data is stored in the memory, because the transfer sequence of the bit pattern is not uniform between various kinds of CPU and LSI circuits of the CRT controller. That is, it is necessary to convert the sequence of the bit pattern for some LSI circuits. Further, when an inverted character or image is displayed on the CRT, it becomes necessary to convert the sequence of the bit pattern. Therefore, it is necessary to provide a conversion means for converting the sequence of the bit pattern between the CPU and the peripheral circuit, or to provide software for converting the sequence of the bit pattern in the CPU.

SUMMARY OF THE INVENTION

The object of the present invention is to provide a bit pattern conversion system enabling an easy connection between a CPU and a peripheral circuit, for example, a CRT controller, without recognition of the sequence of the bit pattern.

In accordance with the present invention, there is provided a bit pattern conversion system for converting a sequence of a bit pattern between a central processing unit and a peripheral circuit, comprising: a data bus line connected between the central processing unit and the peripheral circuit, and a conversion circuit provided in the peripheral circuit for converting the sequence of the bit pattern from a most significant bit to a least significant bit, and vice versa, in accordance with a conversion signal.

DESCRIPTION OF THE PREFERRED EMBODIMENTS

Before describing the preferred embodiments, an explanation will be given of a conventional bit pattern conversion method, for reference.

Figure 1:
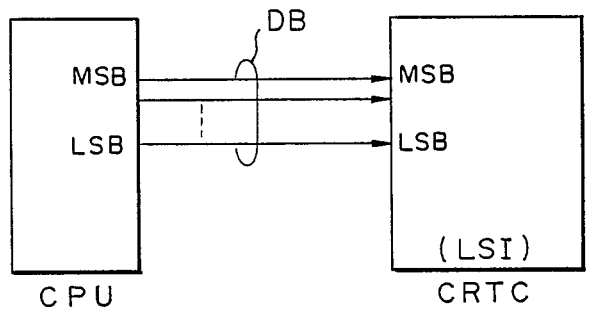
FIGS. 1 and 2 are schematic block diagrams of a conventional bit pattern conversion system.
Figure 2:
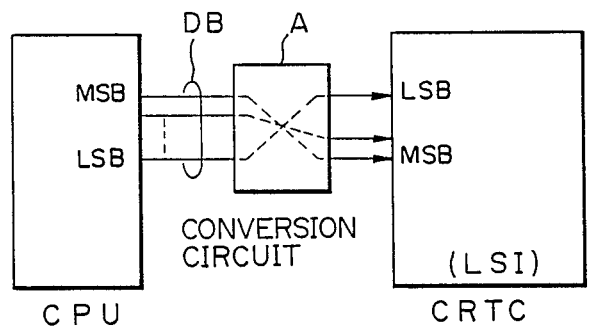

In FIGS. 1 and 2, CRTC is a cathode-ray tube controller constituted by a large scale integrated circuit (LSI), and DB is a data bus line provided between the CPU and the CRTC. As shown in FIG. 1, the transfer sequence of the bit pattern is not converted in the CRTC. That is, the sequence from the MSB to the LSB is used in the CRTC without conversion. This is because the sequence of the bit pattern used in the CRTC complies with the sequence of the bit pattern of the CPU.

As shown in FIG. 2, A is a conversion circuit provided on the data bus line DB for converting the sequence of the bit pattern from the MSB to the LSB, and vice versa. This is provided when the sequence of the bit pattern used in the CRTC is reversed. For example, when the sequence of the bit pattern is expressed by "01011001", this bit pattern is converted to "10011010" by the conversion circuit A. In this case, the MSB is "0" and the LSB is "1". Usually, the conversion circuit A is prepared in an external portion of the RAM chip as an additional circuit. Therefore, space for the conversion circuit is needed on the board, and thus the space of the board is limited. Further, software is also utilized for conversion of the sequence of the bit pattern. In this case, the predetermined conversion program is provided instead of the conversion circuit in the CPU. However, this softward imposes a heavy load on the CPU, and it is difficult for the user to operate such software.

A bit pattern conversion system according to the present invention will be explained in detail hereinafter.

Figure 3:
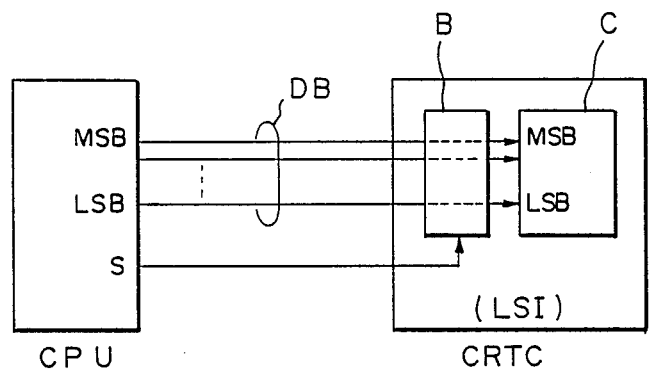
FIGS. 3 and 4 are schematic block diagrams of a bit pattern conversion system according to an embodiment of the present invention.
Figure 4:
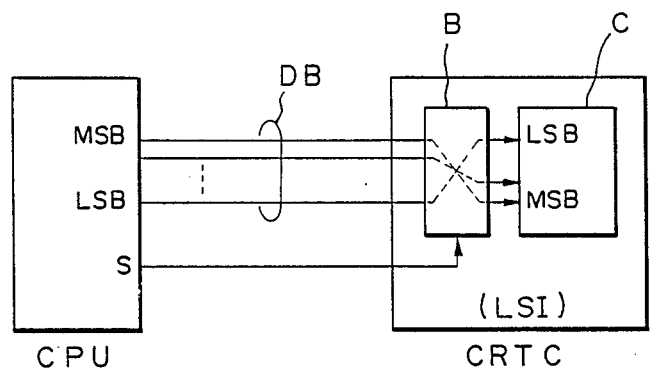

In FIGS. 3 and 4, B is a conversion circuit provided in the CRTC, and C is an internal circuit also provided in the CRTC for dislaying the image data on the CRT. S is a bit conversion signal generated from the CPU and input to the conversion circuit B to convert the sequence of the bit pattern. As shown in FIG. 3, the sequence of the bit pattern is not converted by the conversion circuit B because the sequence of the bit pattern used in the internal circuit C complies with that of the CPU. As shown in FIG. 4, the sequence of the bit pattern is converted by the conversion circuit B in response to the conversion signal S.

The conversion signal S is generated from a system memory in the CPU. The system memory is constituted by a memory map, and the conversion signal S is stored in a register for bit conversion in the memory map. Therefore, the conversion signal S is read out from the memory map based on the predetermined control program when the bit conversion is necessary.

Figure 5:
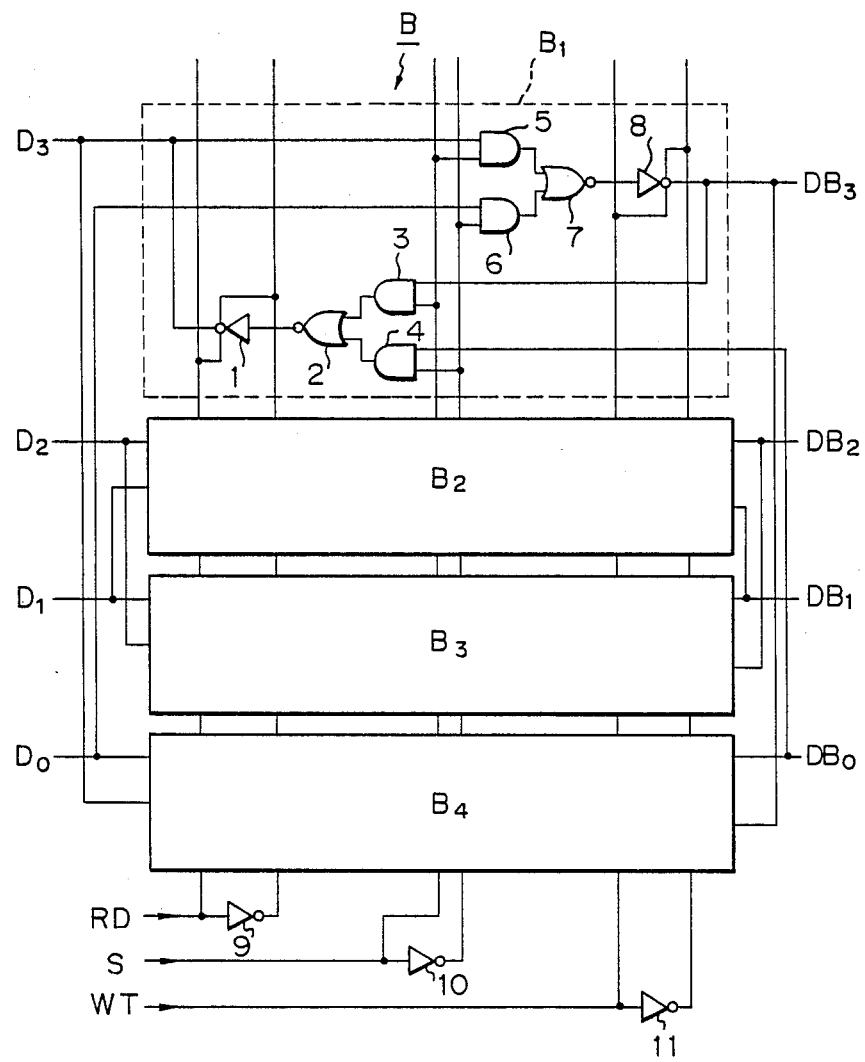
FIG. 5 is a detailed diagram of the conversion circuit shown in FIGS. 3 and 4.

In FIG. 5, this conversion circuit B is used when the bit pattern is four bits. That is, $D_3$ to $D_0$ are input data constituted by 4 bits from the CPU, and $DB_3$ to $DB_0$ are data also constituted by 4 bits output to the CRTC in a write mode. In this case, $D_3$ is the MSB and $D_0$ is the LSB. The conversion circuit B is constituted by four blocks $B_1$ to $B_4$ each having the same structure, and each block corresponds to each bit. Block $B_1$ comprises two switching inverters 1 and 8, two NOR gates 2 and 7, and four AND gates 3 to 6.

The operation of this circuit will be explained in detail hereinafter.

Reference numbers 9 to 11 are inverters. The inverter 9 is connected to the switching inverter 1, the inverter 11 is connected to the switching inverter 8, and the inverter 10 is connected to the AND gates 3 to 6. RD is a read signal and WT is a write signal, and these signals are generated from the CPU. These signals are used for turning ON/OFF the switching inverters 1 and 8.

In the write mode from the CPU to the memory, the write signal WT is "1" and the switching inverter 8 is turned ON. When the conversion signal S is "1", the output of the AND gate 5 becomes "1" or "0" according to the state of the bit "$D_3$". The output of the AND gate 6 becomes "0" regardless of the state of the bit "$D_0$". Therefore, the output of the NOR gate 7 becomes "0" or "1" according to the output of the AND gate 5. That is, when the output of the AND gate 5 is "1", the output of the NOR gate 7 becomes "0", and when the output of the AND gate 5 is "0", the output of the NOR gate 7 becomes "1". The output of the switching inverter 8 is an inverted signal of the output of the NOR gate 7. Therefore, the bit "$D_3$" is not inverted but is output from the switching inverter 8 as the bit "$DB_3$".

When the conversion signal S is "0", the output of the AND gate 5 is "0" and the output of the AND gate 6 becomes "1" or "0" according to the state of the bit "$D_0$". Therefore, the output of the NOR gate 7 becomes "0" or "1", and the bit "$DB_3$" becomes "1" or "0" according to the bit "$D_0$". Consequently, it is possible to convert the sequence of the bit pattern from the MSB to the LSB, and vice versa, in response to the conversion signal S in the write mode.

In the read mode from the memory to the CPU, the read signal RD is "1" and the switching inverter 1 is turned ON. In this case, the circuit is constituted by the AND gates 3 and 4, and the NOR gate 2, and the switching inverter 1 is used for converting the sequence of the bit pattern. The operation of this circuit is the same as that of the write mode explained above, and therefore, a detailed explanation thereof will be omitted. That is, the sequence of the bit pattern is converted in response to "1" or "0" of the conversion signal S.

Each of the blocks $B_2$ to $B_4$ has the same operation as the block $B_1$ in the write and read modes. Therefore, the bit "$D_2$" corresponds to the bit "$DB_1$" and the bit "$D_1$" corresponds to the bit "$DB_2$" when converting the sequence of the bit pattern. Consequently, in the four bits conversion, the correspondence of each bit is expressed by $D_3 \rightleftarrows DB_0$, $D_2 \rightleftarrows DB_1$, $D_1 \rightleftarrows DB_2$, and $D_0 \rightleftarrows DB_3$.

Figure 6:
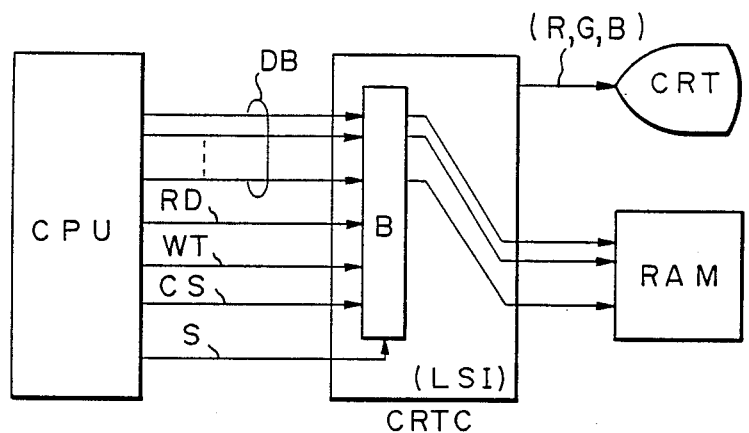
FIG. 6 is a schematic block diagram of a bit pattern conversion system according to another embodiment of the present invention.

In FIG. 6, CS is a chip selection signal, and RAM is a display memory. The CRC is constituted by a large scale integrated circuit (LSI). For example, when an inverted character " " is displayed on the CRT, the sequence of the bit pattern is converted by the conversion signal S in the conversion circuit B, and the converted bit pattern is stored in the RAM. The inverted character " " can be displayed on the CRT by reading out from the RAM. In this case, the write signal is "1" since the data is written in the RAM.

Figure 7:
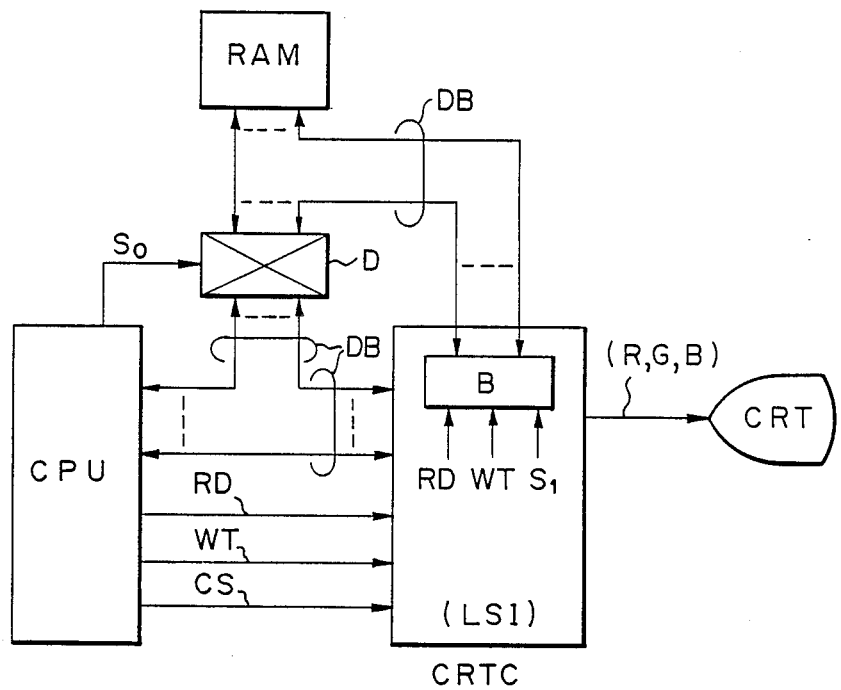
FIG. 7 is a schematic block diagram of a bit pattern conversion system according to still another embodiment of the present invention.

In FIG. 7, D is a switching circuit for switching the connection of the data bus lines DB between the CPU and the display RAM. That is, when the data is written from the CPU to the RAM, the switching circuit D is turned ON so as to connect the CPU and the RAM by a control signal $S_0$, and when the data is read out from the RAM to the CRTC, the switching circuit D is turned OFF so as to isolate the CPU from the RAM by the control signal $S_0$. In this case, the data indicating an attribute of the character is added in the RAM at every one character by the CPU. That is, whether or not the character should be inverted is indicated by the attribute data on the RAM. The data from the RAM is converted by a conversion signal $S_1$ generated in the CRTC itself in accordance with the state of the attribute data transferred from the RAM to the CRTC. Therefore, the sequence of the bit pattern can be easily converted in the CRTC regardless of the transfer sequence from the CPU. In this case, the conversion signal $S_1$ is generated by the software in the CRTC.

We claim:

1. A bit pattern conversion system for converting a sequence of a bit pattern between a central processing unit and a peripheral circuit, comprising:
   a data bus line connected between said central processing unit and said peripheral circuit, and
   a conversion means provided in said peripheral circuit for converting said sequence of said bit pattern from a most significant bit to a least significant bit, and vice versa, in accordance with a conversion signal.

2. A bit pattern conversion system as claimed in claim 1, wherein said conversion signal is generated from said central processing unit.

3. A bit pattern conversion system as claimed in claim 1, wherein said conversion signal is generated in said peripheral circuit itself.

4. A bit pattern conversion system as claimed in claim 1, wherein said conversion means comprises a plurality of conversion blocks corresponding to a number of bits, each of said conversion blocks comprising, two switching inverters turned ON/OFF by a write signal and a read signal generated from said central processing unit, four AND gates inputting said conversion signal and each of said bits, and two NOR gates connected between said AND gates and said switching inverter.

5. A bit pattern conversion system as claimed in claim 4, wherein said conversion circuit is connected to a display memory through the data bus line, and a bit pattern inverted by said conversion signal is stored in said display memory.

6. A bit pattern conversion system as claimed in claim 4, wherein an output of said conversion block is switched in correspondence with a write mode and a read mode.

7. A bit pattern conversion system as claimed in claim 3, wherein said conversion signal is generated in response to an attribute data added to the data in a display memory.

8. A bit pattern conversion system for converting a sequence of a bit pattern between a central processing unit and a peripheral circuit comprising:
   data bus lines connected among said central processing unit, said peripheral circuit and a display memory;
   a switching circuit for switching said data bus lines between said central processing unit and said display memory in response to a control signal generated from said central processing unit; and
   a conversion means provided in said peripheral circuit for converting said sequence of said bit pattern received from said display memory through said data bus lines based on a conversion signal, said conversion signal being generated in said peripheral circuit itself based on an attribute data in said display memory which is received by said peripheral circuit.

* * * * *